(12) United States Patent
Gill

(10) Patent No.: US 6,411,477 B1
(45) Date of Patent: Jun. 25, 2002

(54) ANTIPARALLEL PINNED SPIN VALVE READ HEAD WITH IMPROVED MAGNETORESISTANCE AND BIASING

(75) Inventor: Hardayal Singh Gill, Portala Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/500,395

(22) Filed: Feb. 8, 2000

(51) Int. Cl.$^7$ .................................................. G11B 5/39
(52) U.S. Cl. .............. 360/324.12; 360/320; 360/324.11
(58) Field of Search .............................. 360/324.1, 324, 360/324.11, 324.12, 319, 320

(56) References Cited

U.S. PATENT DOCUMENTS

| | | | |
|---|---|---|---|
| 5,465,185 A | * 11/1995 | Heim et al. ................... | 360/113 |
| 5,696,656 A | * 12/1997 | Gill et al. .................... | 360/113 |
| 5,701,222 A | 12/1997 | Gill ............................. | 360/113 |
| 5,748,399 A | 5/1998 | Gill ......................... | 360/113 X |
| 5,771,141 A | * 6/1998 | Ohtsuka et al. .............. | 360/113 |
| 5,828,529 A | 10/1998 | Gill ............................. | 360/113 |
| 5,841,692 A | 11/1998 | Gallagher et al. ........... | 365/173 |
| 5,880,913 A | 3/1999 | Gill ............................. | 360/113 |
| 2001/0043447 A1 | * 11/2001 | Saito et al. ............. | 360/324.11 |

* cited by examiner

*Primary Examiner*—Craig A. Renner
*Assistant Examiner*—Noel Monardes
(74) *Attorney, Agent, or Firm*—G. Marlin Knight; Ervin F. Johnston

(57) ABSTRACT

A read head includes a spin valve sensor which is located between first and second read gap layers and the first and second read gap layers are located between first and second shield layers. The spin valve sensor includes a free layer, an antiparallel (AP) pinned layer structure, a pinning layer exchange coupled to the AP pinned layer structure for pinning a magnetic moment of the AP pinned layer structure, a nonmagnetic conductive spacer layer located between the free layer and the AP pinned layer structure wherein the free layer includes a cobalt based layer that interfaces the spacer layer. The AP pinned layer structure includes an AP coupling layer which is located between first and second AP pinned layers wherein the second AP pinned layer is thicker than the first AP pinned layer. A distance from a center of the free layer to one of the first and second shield layers is greater than a distance from the center of the free layer to the other of the first and second shield layers.

18 Claims, 13 Drawing Sheets

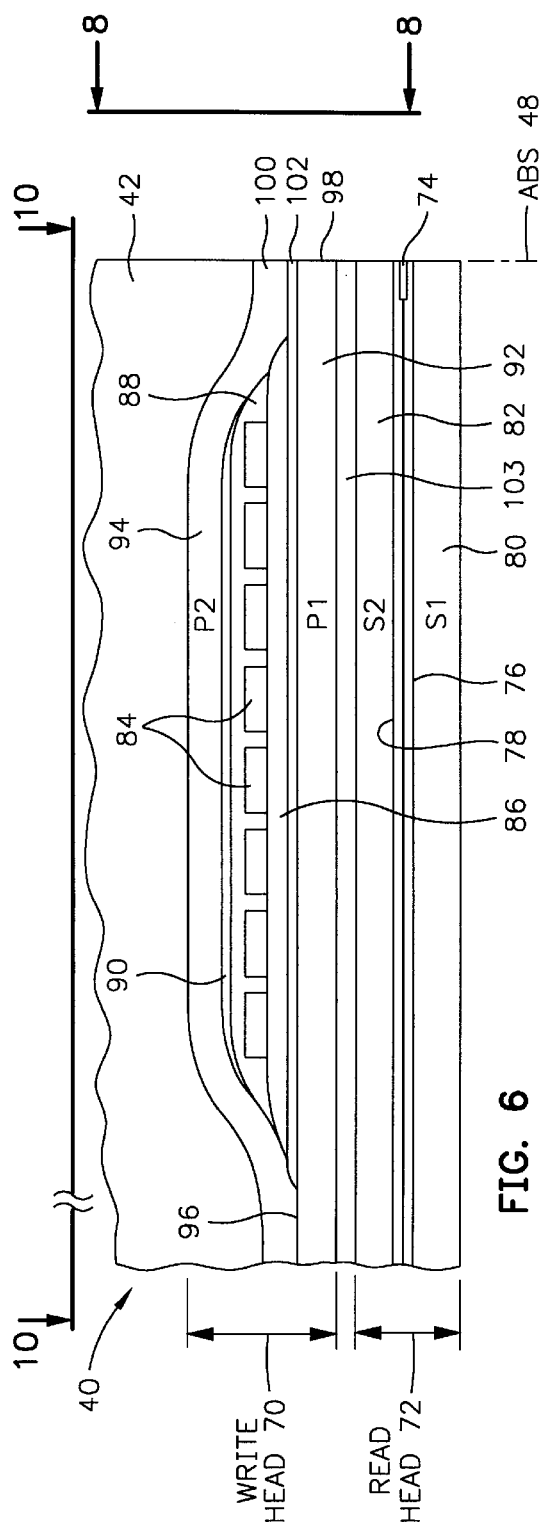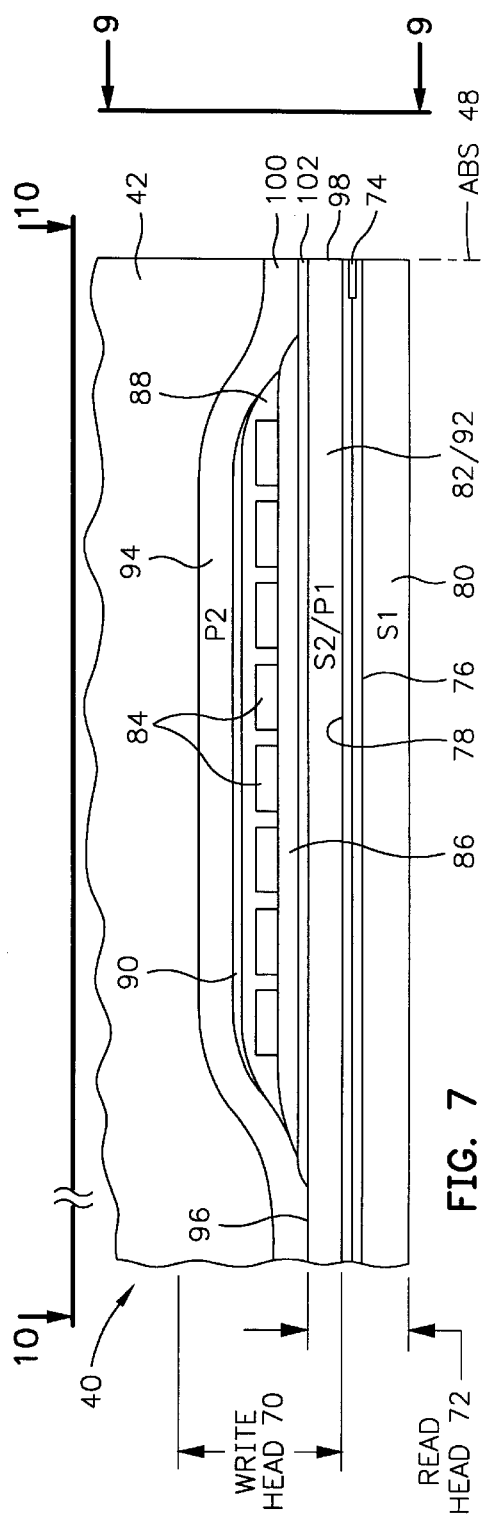

(ABS)

ANTIPARALLEL PINNED SPIN VALVE READ HEAD WITH IMPROVED MAGNETORESISTANCE AND BIASING

BACKGROUND OF THE INVENTION

1. Field of the Invention

The present invention relates to an antiparallel spin valve read head with improved magnetoresistance and biasing and, more particularly, to an antiparallel pinned spin valve read sensor which has a free layer structure that includes a cobalt or cobalt based layer that interfaces a spacer layer for improved magnetoresistance and a sizing and positioning of layers of the spin valve sensor for minimizing readback asymmetry.

2. Description of the Related Art

The heart of a computer is an assembly that is referred to as a magnetic disk drive. The magnetic disk drive includes a rotating magnetic disk, a slider that has read and write heads, a suspension arm above the rotating disk and an actuator that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive spacer layer sandwiched between a ferromagnetic pinned layer and a ferromagnetic free layer. An antiferromagnetic pinning layer interfaces the pinned layer for pinning the magnetic moment of the pinned layer 90° to an air bearing surface (ABS) wherein the ABS is an exposed surface of the sensor that faces the rotating disk. First and second leads are connected to the spin valve sensor for conducting a sense current therethrough. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is preferably parallel to the ABS, is when the sense current is conducted through the sensor without magnetic field signals from the rotating magnetic disk. If the quiescent position of the magnetic moment is not parallel to the ABS the positive and negative responses of the free layer will not be equal which results in read signal asymmetry which is discussed in more detail hereinbelow.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons is scattered by the interfaces of the spacer layer with the pinned and free layers. When the magnetic moments of the pinned and free layers are parallel with respect to one another scattering is minimal and when their magnetic moments are antiparallel scattering is maximized. An increase in scattering of conduction electrons increases the resistance of the spin valve sensor and a decrease in scattering of the conduction electrons decreases the resistance of the spin valve sensor. Changes in resistance of the spin valve sensor is a function of $\cos\theta$, where $\theta$ is the angle between the magnetic moments of the pinned and free layers. When a sense current is conducted through the spin valve sensor, resistance changes cause potential changes that are detected and processed as playback signals from the rotating magnetic disk.

The sensitivity of the spin valve sensor is quantified as magnetoresistance or magnetoresistive coefficient dr/R where dr is the change in resistance of the spin valve sensor from minimum resistance (magnetic moments of free and pinned layers parallel) to maximum resistance (magnetic moments of the free and pinned layers antiparallel) and R is the resistance of the spin valve sensor at minimum resistance. In order to improve the sensitivity of the spin valve sensor a soft magnetic material, such as nickel iron (NiFe), is employed as the free layer. It has been found, however, that when a free layer structure employs a cobalt based layer in addition to the nickel iron (NiFe) free layer that the magnetoresistive coefficient dr/R increases when the cobalt based layer is located between and interfaces the nickel iron (NiFe) free layer and a copper (Cu) spacer layer. Because of the high magnetoresistance of a spin valve sensor it is sometimes referred to as a giant magnetoresistive (GMR) sensor.

An improved spin valve, which is referred to hereinafter as antiparallel pinned (AP) spin valve, is described in commonly assigned U.S. Pat. No. 5,465,185 to Heim and Parkin which is incorporated by reference herein. The AP spin valve differs from the spin valve described above in that the pinned layer comprises multiple thin films, hereinafter referred to as AP pinned layer. The AP pinned layer has a nonmagnetic spacer film which is sandwiched between first and second ferromagnetic thin films. The first thin film, which may comprise several thin films, is immediately adjacent to the antiferromagnetic layer and is exchange-coupled thereto, with its magnetic moment directed in a first direction. The second thin film is immediately adjacent to the free layer and is exchange-coupled to the first thin film by the minimal thickness (in the order of 6 Å) of the spacer film between the first and second thin films. The magnetic moment of the second thin film is oriented in a second direction that is antiparallel to the direction of the magnetic moment of the first film. The magnetic moments of the first and second films subtractively combine to provide a net moment of the AP pinned layer. The direction of the net moment is determined by the thicker of the first and second thin films. The thicknesses of the first and second thin films are chosen so that the net moment is small. A small net moment equates to a small demagnetization (demag) field from the AP pinned layer. Since the antiferromagnetic exchange coupling is inversely proportional to the net moment, this results in a large exchange coupling.

A large exchange coupling promotes higher thermal stability of the head. When the head encounters high heat conditions due to electrostatic discharge from an object, or due to contacting an asperity on the magnetic disk, a critical high temperature of the antiferromagnetic layer, hereinafter referred to as blocking temperature, can be exceeded, causing the magnetic spins of the pinning layer to be free to rotate in response to a magnetic field. The magnetic moment of the AP pinned layer is then no longer pinned in the desired direction. In this regard, significant advantages of the AP pinned spin valve over the typical single film pinned layer are a greater exchange coupling field and a lower demag field, which enhance thermal stability of the spin valve sensor.

As stated hereinabove, the AP pinned layer structure of the spin valve sensor imposes less demagnetization field $H_D$ on the free layer structure. This is important because a demagnetization field from a pinned layer structure, whether it be a simple single pinned layer or an AP pinned layer structure, is not uniform between the ends of the pinned layer structure that are perpendicular to the ABS. The demagnetization field is strongest at the ends and decays toward the middle of the sensor due to the first and second shield layers. This causes a nonuniform biasing of the free layer structure that impacts the sensitivity of the read head. Further, the demagnetization field $H_D$ is a function of the stripe height of the sensor wherein the stripe height is the distance between the ABS and an opposite recessed end of the sensor in the read head. The reason for this variation is because of the difficulty in controlling the lapping of various rows of magnetic head assemblies to establish their stripe heights. Unfortunately there is a sigma (distribution of stripe heights) from row to row and between the magnetic head assemblies from row to row. Accordingly, magnetic heads from one row of magnetic heads may have positive readback asymmetry while magnetic heads from another row of magnetic heads may have a negative readback asymmetry. Since the demagnetization field from the AP pinned layer structure is significantly less than that from a simple pinned layer the aforementioned sigma and degree of nonuniform demagnetization field $H_D$ acting on the free layer structure is minimized.

The transfer curve for a spin valve sensor is defined by the aforementioned $\cos \theta$ where $\theta$ is the angle between the directions of the magnetic moments of the free and pinned layers. In a spin valve sensor subjected to positive and negative magnetic signal fields from a moving magnetic disk, which are typically chosen to be equal in magnitude, it is desirable that positive and negative changes in the resistance of the spin valve read head above and below a bias point on the transfer curve of the sensor be equal so that the positive and negative readback signals are equal. When the direction of the magnetic moment of the free layer is substantially parallel to the ABS and the direction of the magnetic moment of the pinned layer is perpendicular to the ABS in a quiescent state (no signal from the magnetic disk) the positive and negative readback signals should be equal when sensing positive and negative fields that are equal from the magnetic disk. Accordingly, the bias point should be located midway between the top and bottom of the transfer curve. When the bias point is located below the midway point the spin valve sensor is negatively biased and has positive asymmetry and when the bias point is above the midway point the spin valve sensor is positively biased and has negative asymmetry. The designer strives to improve asymmetry of the readback signals as much as practical with the goal being symmetry. When the readback signals are asymmetrical, signal output and dynamic range of the sensor are reduced.

Readback asymmetry is defined as $$\frac{V_1 - V_2}{\max(V_1 \text{ or } V_2)}.$$

For example, +10% readback asymmetry means that the positive readback signal $V_1$, is 10% greater than it should be to obtain readback symmetry. 10% readback asymmetry is acceptable in many applications. +10% readback asymmetry may not be acceptable in applications where the applied field magnetizes the free layer close to saturation. In these applications +10% readback asymmetry can saturate the free layer in the positive direction and will, of course, reduce the negative readback signal by 10%. An even more subtle problem is that readback asymmetry impacts the magnetic stability of the free layer. Magnetic instability of the free layer means that the applied signal has disturbed the arrangement or multiplied one or more magnetic domains of the free layer. This instability changes the magnetic properties of the free layer which, in turn, changes the readback signal. The magnetic instability of the free layer can be expressed as a percentage increase or decrease in instability of the free layer depending upon the percentage of the increase or decrease of the asymmetry of the readback signal. Standard deviation of the magnetic instability can be calculated from magnetic instability variations corresponding to multiple tests of the free layer at a given readback asymmetry.

There is approximately a 0.2% decrease in standard deviation of the magnetic instability of the free layer for a 1% decrease in readback asymmetry. This relationship is substantially linear which will result in a 2.0% reduction in the standard deviation when the readback asymmetry is reduced from +10% to zero. Magnetic instability of the free layer is greater when the readback asymmetry is positive. Accordingly, the magnetic instability of the free layer is greater when the readback asymmetry is positive than when the readback asymmetry is negative. A positive readback asymmetry can be improved by changing thickness of the magnetic layers and/or changing the sense current, however, a change of one of these parameters can change other parameters making it a trial and error process to reduce the asymmetry. More importantly, however, is that the channel electronics of the disk drive as well as specific thicknesses of the magnetic layers are designed to satisfy other magnetic considerations. Since these values are set it is manifest that there is a need to deal with the many magnetic influences on the free layer of the AP pinned spin valve so that the net value of these influences on the free layer can be reduced to virtually zero thereby reducing the asymmetry to virtually zero.

A spin valve sensor has a magnetoresistive (MR) coefficient which is substantially higher than the MR coefficient of an anisotropic magnetoresistive (AMR) sensor. In the AMR sensor changes in the scattering of the conduction electrons changes the resistance of the AMR sensor proportional to $\cos^2 \theta$ where $\theta$ is the angle between the directions of a sense current conducted through the AMR sensor and the moment of a ferromagnetic layer. The resistance of the AMR sensor is maximum when the directions of the sense current and the moment of the ferromagnetic layer are parallel or antiparallel and the resistance of the AMR sensor is minimum when the these directions are perpendicular. The AMR effect in the AMR sensor is also present in the spin valve sensor and its affect on the bias point can be defined in terms of magnitude and direction. The AMR effect on a spin valve sensor always causes negative asymmetry because the resistance change of the spin valve sensor in response to the positive and negative signal fields is always positive which causes a positive bias on the magnetic moment of the free layer.

When the sense current $I_s$ is applied to the spin valve sensor there is an image sense current in each of the first and second shield layers. The image sense current in each shield layer causes each shield layer to produce an image sense current field $H_{IM}$ which traverses the free layer in a direction that is substantially perpendicular to the ABS. When the free layer of the AP pinned spin valve is symmetrically located midway between the first and second shield layers the image sense current fields counterbalance each other so that the net image sense current field on the free layer is zero. By asymmetrically locating the free layer between the first and second shield layers a net image sense current field can be employed for counterbalancing the net magnetic and AMR effect influences on the free layer. This is accomplished by sizing the first and second gap layers that separate the free layer from the first and second shield layers respectively so that the free layer is closer to a selected one of the shield layers. It is preferred that the second gap be thinner than the first gap so that the free layer is closer to the second shield layer. When these thicknesses are carefully selected readback asymmetry can be improved so that magnetic stability of the free layer is optimized.

The location of the transfer curve relative to the bias point is influenced by five major forces on the free layer of a spin valve sensor, namely a ferromagnetic coupling field $H_{FC}$ between the pinned layer and the free layer, a net demag field $H_D$ from the pinned layer, a sense current field $H_I$ from all conductive layers of the spin valve except the free layer, a net image current field $H_{IM}$ from the first and second shield layers and the influence of the AMR effect. There is a need to deal with these forces on the free layer so as to improve asymmetry of the readback signals.

SUMMARY OF THE INVENTION

The bias point of an AP pinned layer structure, as described hereinabove, without the cobalt or cobalt based layer in the free layer structure can be balanced with the AMR effect $H_{AMR}$ and the image current field $H_{IM}$ opposing the ferromagnetic coupling field $H_{FC}$, the sense current field $H_I$ and the demagnetization field $H_D$. However, when the cobalt or cobalt based layer is included in the free layer structure the AMR effect $H_{AMR}$ becomes negligible and the image current field $H_{IM}$ is not sufficient to counterbalance the ferromagnetic coupling field $H_{FC}$, the sense current field Hand the demagnetization field $H_D$. I have overcome the aforementioned problem by making the second AP pinned layer of the AP pinned layer structure thicker than the first AP pinned layer wherein the second AP pinned layer interfaces the spacer layer. In a bottom type spin valve sensor the first read gap is greater than the second read gap so that an imaging sense current $H_{IM}$ from the second shield layer is controlling and is in the same direction as the ferromagnetic coupling field $H_{FC}$. With the sense current being conducted in either direction through the sensor the net demagnetization field $H_D$ from the AP pinned layer structure and the sense current field $H_I$ will counterbalance the ferromagnetic coupling field $H_{FC}$ and the image current field $H_{IM}$. With this arrangement the bias point can be located midway on the transfer curve of the sensor for establishing readback symmetry.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DESCRIPTION OF THE PREFERRED EMBODIMENTS

Magnetic Disk Drive

Figure 1:
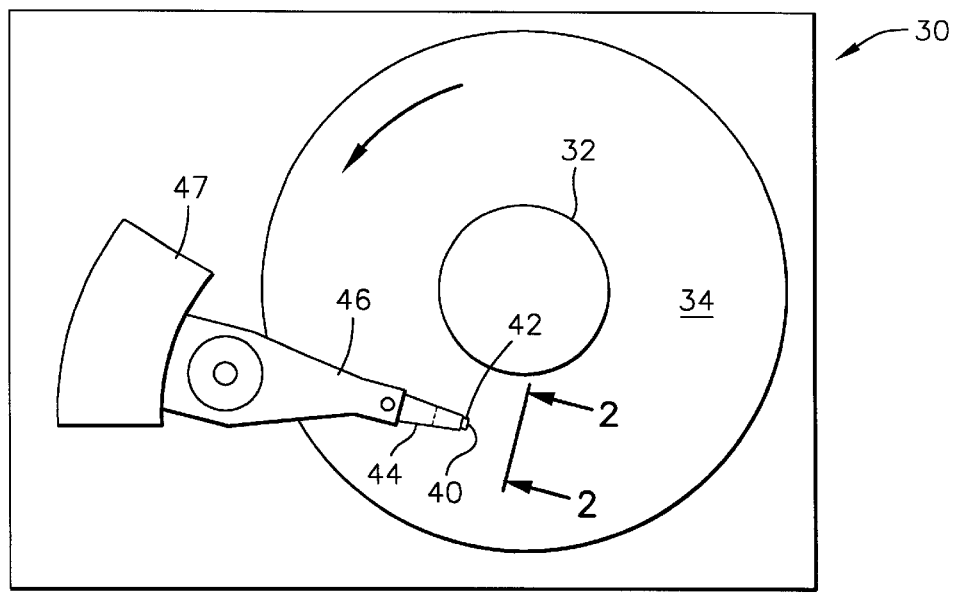
FIG. 1 is a plan view of an exemplary magnetic disk drive.
Figure 2:
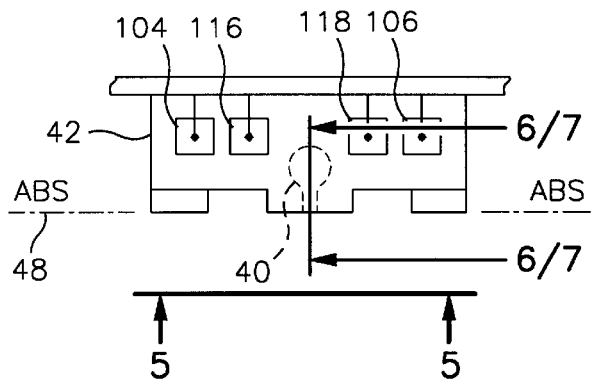
FIG. 2 is an end view of a slider with a magnetic head of the disk drive as seen in plane 2—2 of FIG. 1.
Figure 3:
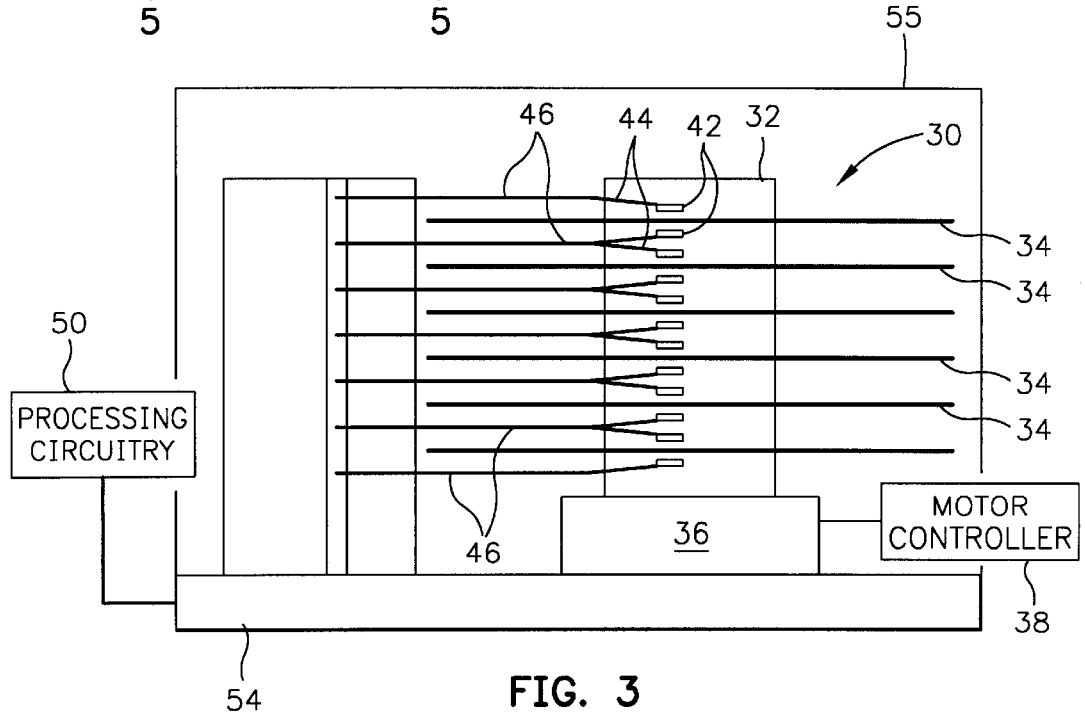
FIG. 3 is an elevation view of the magnetic disk drive wherein multiple disks and magnetic heads are employed.
Figure 4:
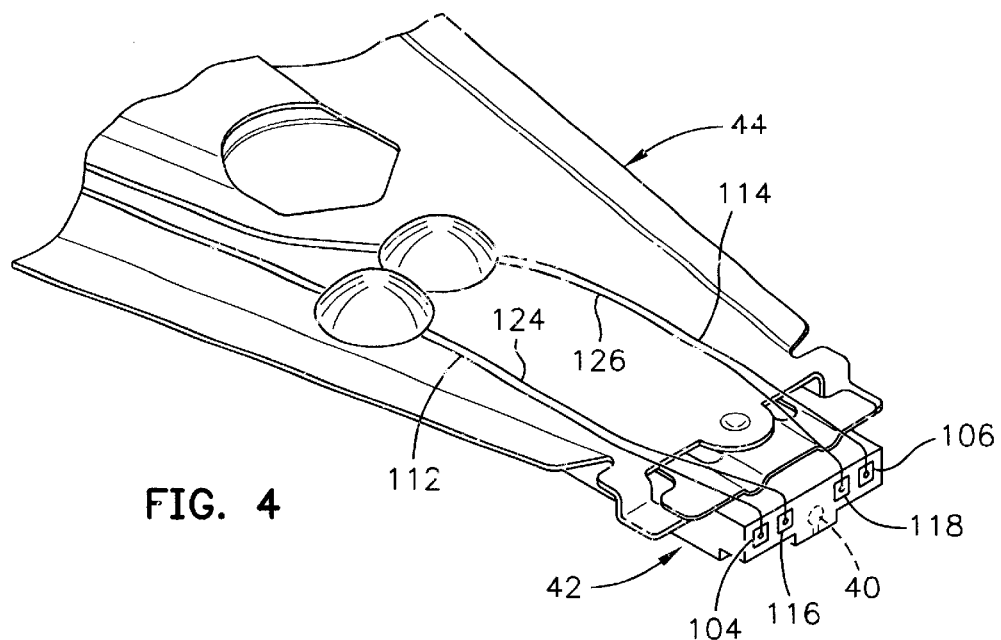
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, .05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
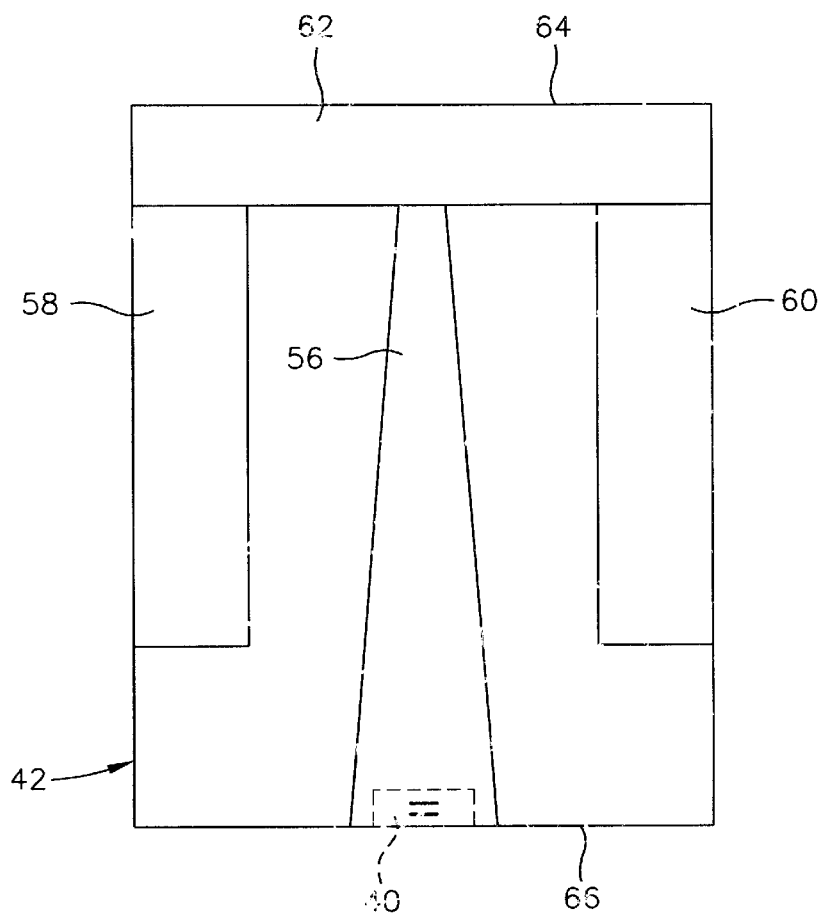
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
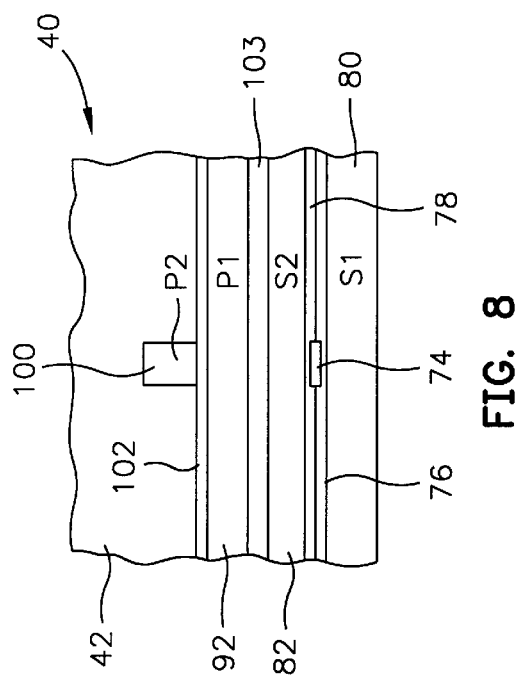
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

Figure 10:
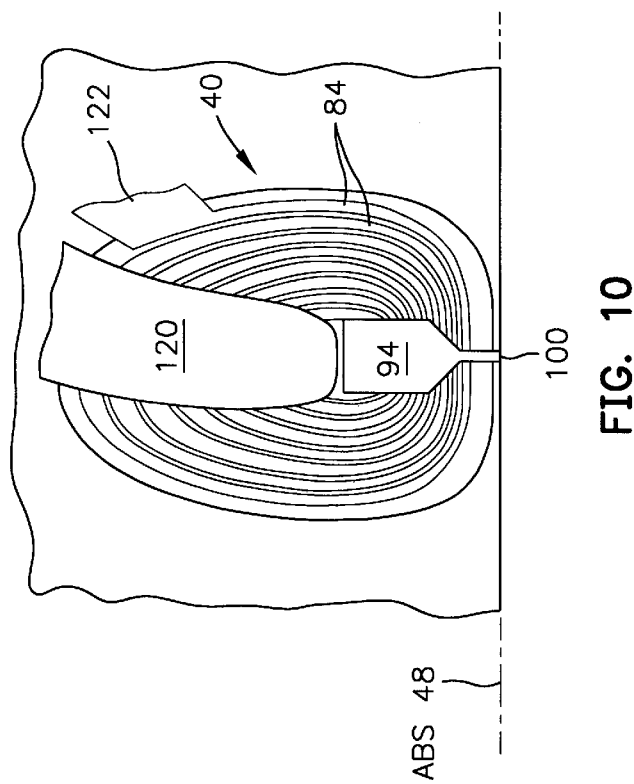
FIG. 10 is a view taken along plane 10—10 of FIGS. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between yoke portions of first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 9:
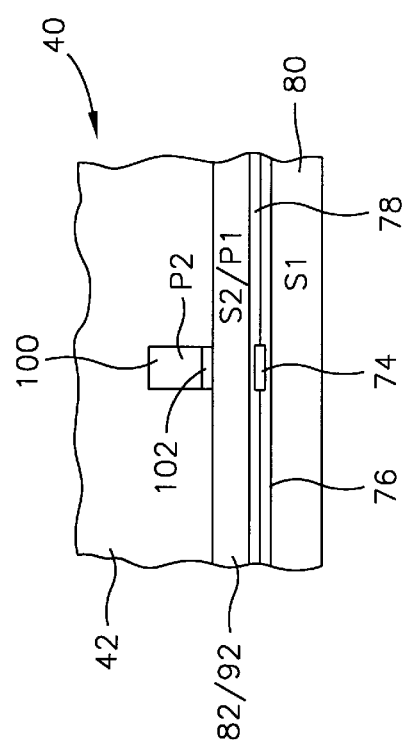
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
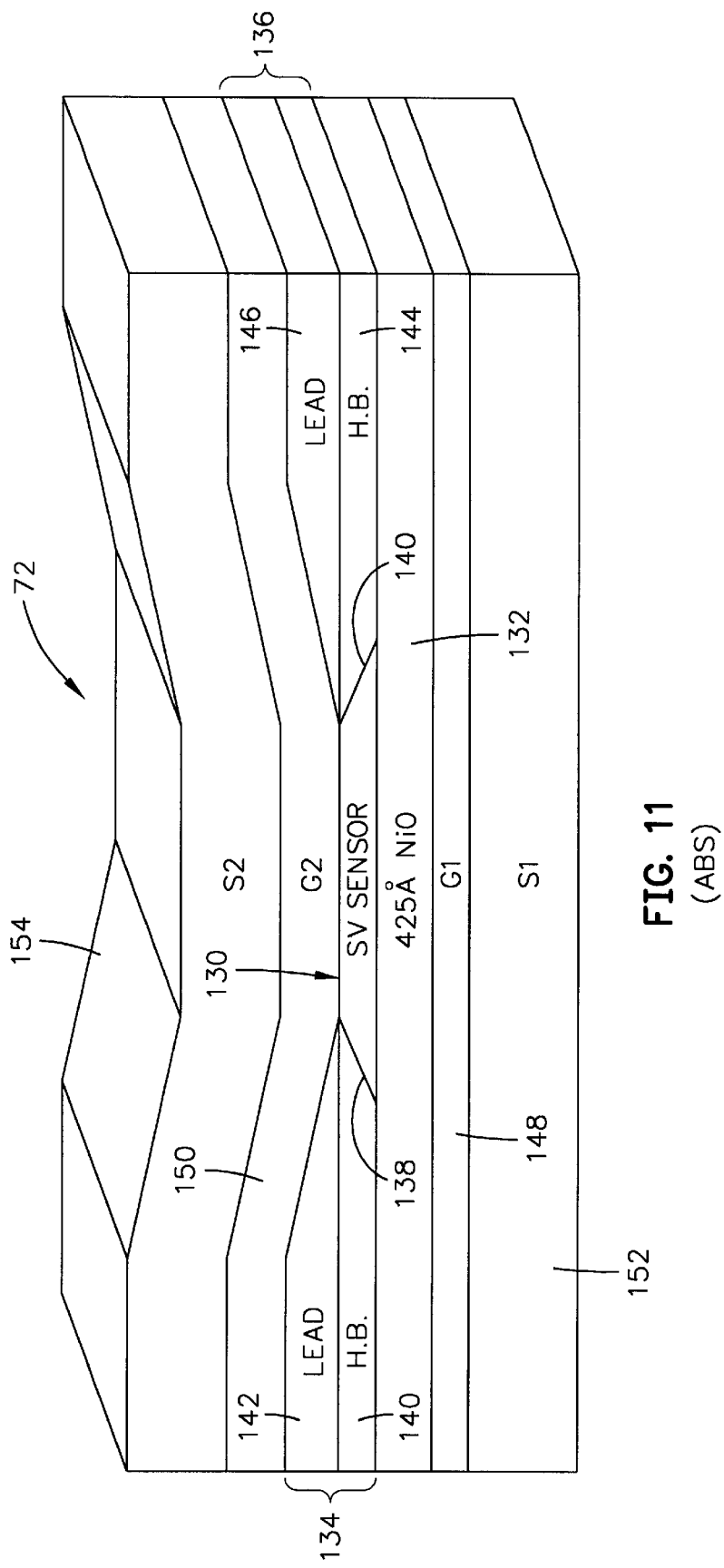
FIG. 11 is an isometric ABS illustration of a read head which employs an AP pinned spin valve (SV) sensor.

FIG. 11 is an isometric ABS illustration of the read head 72 shown in FIGS. 6 or 8. The read head 72 includes the present spin valve sensor 130 which is located on an antiferromagnetic (AFM) pinning layer 132. A ferromagnetic pinned layer in the spin valve sensor 130, which is to be described hereinafter, is pinned by the magnetic spins of the pinning layer 132. The AFM pinning layer may be 425 Å of nickel oxide (NiO). First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 130 for stabilizing the magnetic domains therein. The AFM pinning layer 132, the spin valve sensor 130 and the first and second hard bias and lead layers 134 and 136 are located between nonmagnetic electrically insulative first and second read gap layers 148 and 150. The first and second read gap layers 148 and 150 are, in turn, located between ferromagnetic first and second shield layers 152 and 154.

Spin Valve Read Heads

Figure 12:
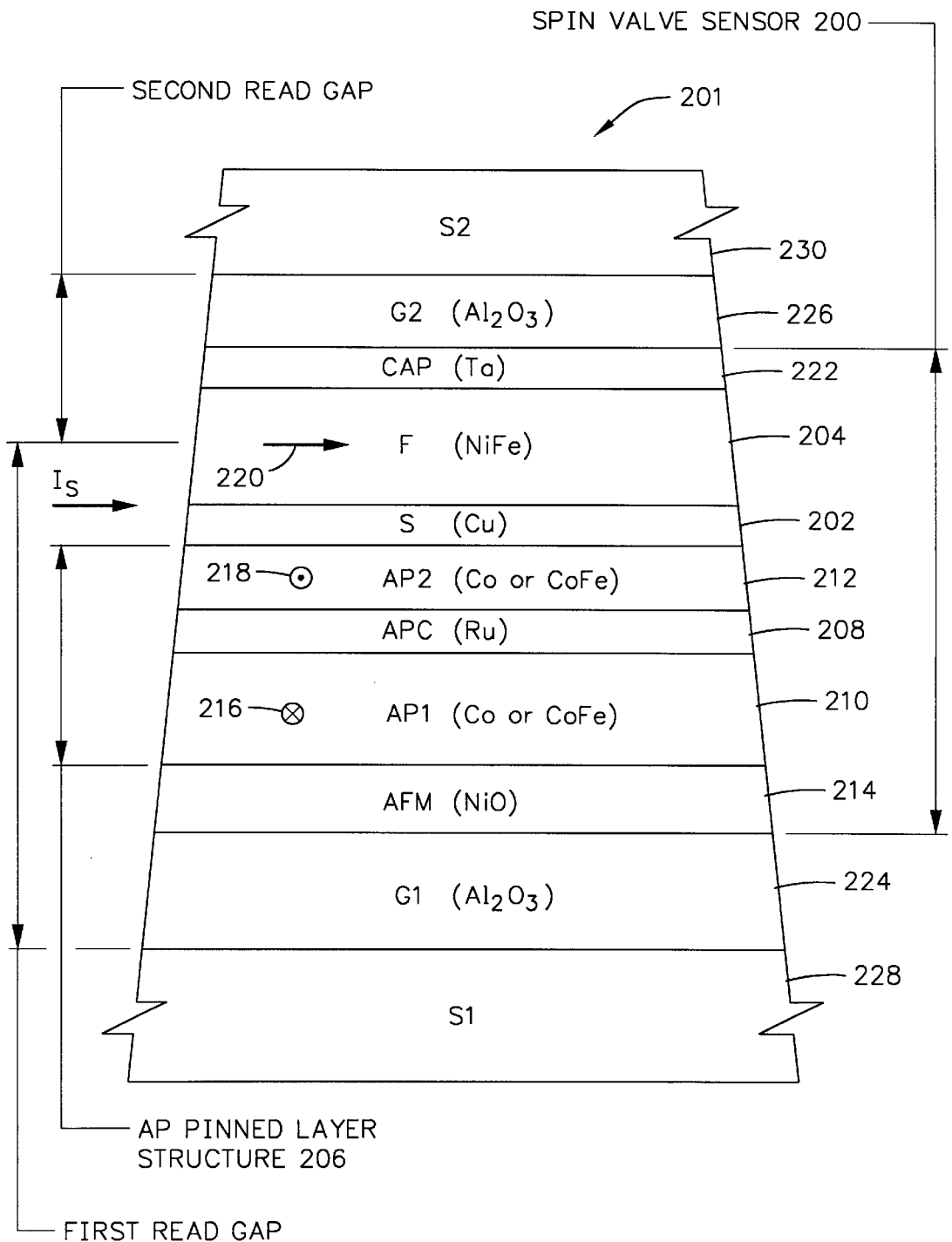
FIG. 12 is an ABS illustration of a spin valve sensor wherein the free layer structure does not include a cobalt or cobalt based layer.
Figure 13:
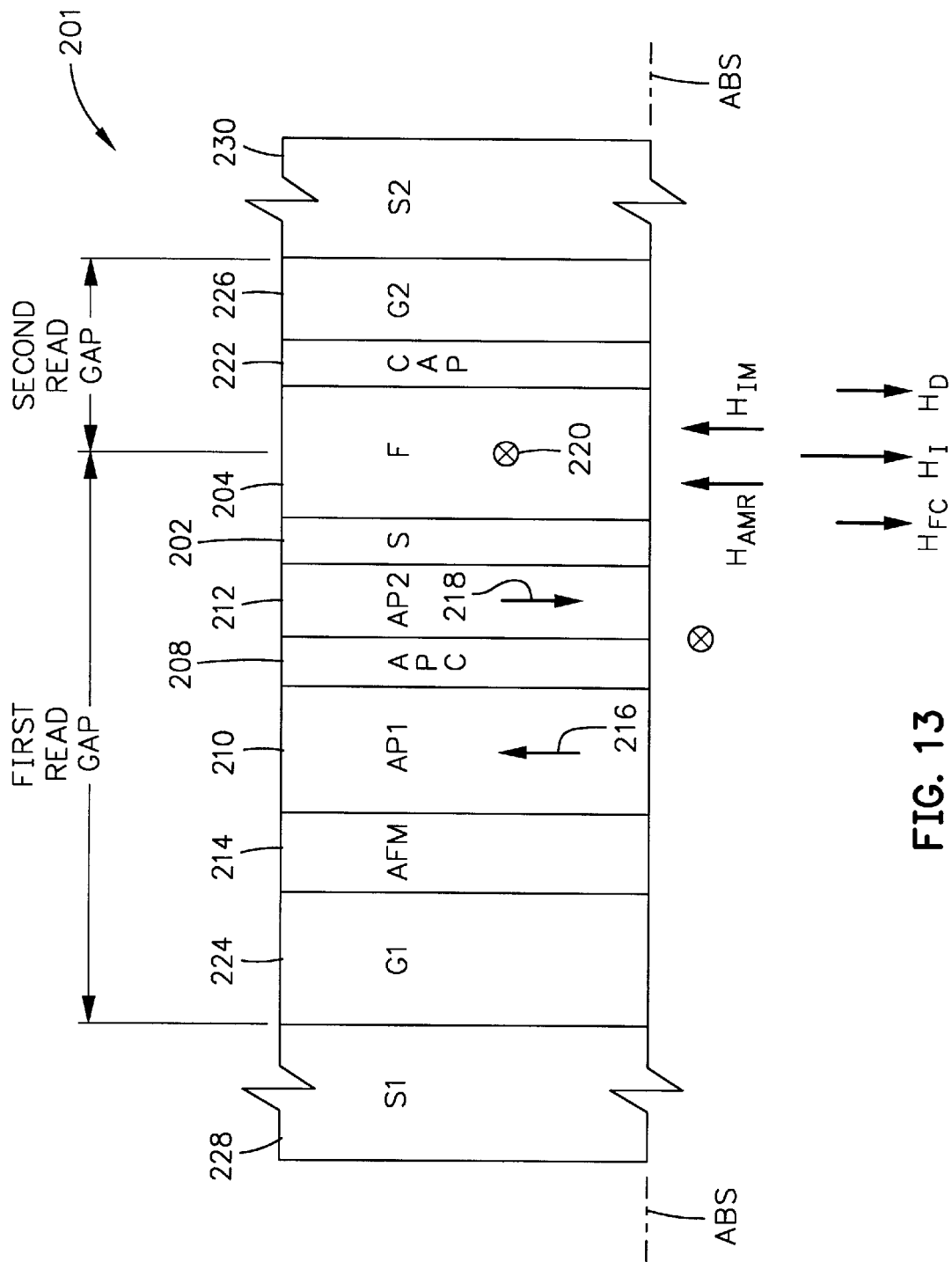
FIG. 13 is a side view of FIG. 12.

An exemplary spin valve sensor 200 in a read head 201 is illustrated in FIGS. 12 and 13 wherein a nonmagnetic conductive spacer layer 202 is located between a ferromagnetic free layer 204 and a pinned layer structure 206. The AP pinned layer structure includes an antiparallel coupling (APC) layer 208 which is located between ferromagnetic first and second AP pinned layers 210 and 212. The first AP pinned layer 210, which is thicker than the second AP pinned layer 212, interfaces a pinning layer (AFM) layer 214. This interface causes an exchange coupling so that magnetic spins of the pinning layer 214 pin a magnetic moment 216 of the first AP pinned layer 210 perpendicular to the ABS, such as perpendicular to and away from the ABS as shown in FIG. 12. Because of an antiparallel coupling between the first and second AP pinned layers 210 and 212, the magnetic moment 218 of the second AP pinned layer 212 is directed antiparallel to the magnetic moment 216. The free layer 204 has a magnetic moment 220 which is directed parallel to the ABS when the bias point is centered on the transfer curve of the sensor when the sensor is in a quiescent condition. The quiescent condition is when the sense current $I_S$ is conducted through the sensor without the imposition of field signals from a rotating magnetic disk. When the magnetic moment 220 is not parallel to the ABS there is readback asymmetry which may be positive or negative. When a field signal rotates the magnetic moment 220 upwardly into the read head the magnetic moments 220 and 218 become more antiparallel which increases the resistance of the head and when an opposite field signal rotates the magnetic moment 220 downwardly away from the head the magnetic moments 220 and 218 become more parallel which decreases the resistance of the sensor. When the sense current $I_S$ is conducted through the sensor these changes in resistance of the spin valve sensor are processed as readback signals by the processing circuitry in FIG. 3. The processing circuitry 50 in FIG. 3 may also include a sense current source for conducting the sense current $I_S$ through the spin valve sensor via the leads 142 and 146 shown in FIG. 11.

A cap layer 222 is located on the free layer 204 for protecting it from subsequent processing steps. The spin valve sensor 200 which includes layers 214, 210, 208, 212, 202, 204 and 222 are located between first and second gap layers (G1 and G2) 224 and 226, and the first and second gap layers 224 and 226 are located between ferromagnetic first and second shield layers (S1 and S2) 228 and 230. The first read gap of the read head 201 is located between the first shield layer 228 and the middle of the free layer 204 and the second read gap is located between the second shield layer and the middle of the free layer 204.

Exemplary materials for the layers are aluminum oxide ($Al_2O_3$) for the first and second gap layers 224 and 226, nickel oxide (NiO) for the pinning layer 214, cobalt or a cobalt based layer for each of the first and second AP pinned layers 210 and 212, ruthenium (Ru) for the antiparallel coupling layer 208, copper (Cu) for the spacer layer 202, nickel iron (NiFe) for the free layer 204 and tantalum (Ta) for the cap layer 222. The preferred material for the pinning layer 214 is nickel oxide (NiO) since it is nonconductive and will reduce a sense current field on the free layer 204 when the sense current $I_S$ is conducted through the read head.

As shown in FIG. 13, the free layer 204 is subjected to various magnetic fields as well as the AMR effect. The AMR effect $H_{AMR}$ always makes the magnetic moments 220 and 218 more antiparallel which increases the resistance and causes a more negative readback signal. Each of the first and second shield layers 228 and 230 impose an imaging field on the free layer 204, however, since the free layer 204 is closer to the second shield layer 230 than to the first shield layer 228 a net current imaging field $H_{IM}$ coming from the second shield layer 230 is controlling. The second AP pinned layer 212 causes a ferromagnetic coupling field $H_{FC}$ on the free layer 204 which is directed in the same direction as the magnetic moment 218. Since the first AP pinned layer 210 is thicker than the second AP pinned layer 212 a net demag $H_D$ is imposed on the free layer by the first AP pinned layer 210 in a downward direction. The sense current field $H_I$ on the free layer 204 is a net sense current field on the free layer 204 due to all conductive layers of the spin valve sensor other than the free layer 204. With the arrangement shown in FIG. 13 the AMR effect $H_{AMR}$ and the sense current imaging field $H_{IM}$ oppose the ferromagnetic coupling field $H_{FC}$, sense current field $H_I$ and the net demagnetization field $H_D$. With sufficient values of these various influences on the free layer the magnetic moment 220 can be maintained at or close to parallel to the ABS so that the read head is biased for readback symmetry.

Figure 14:
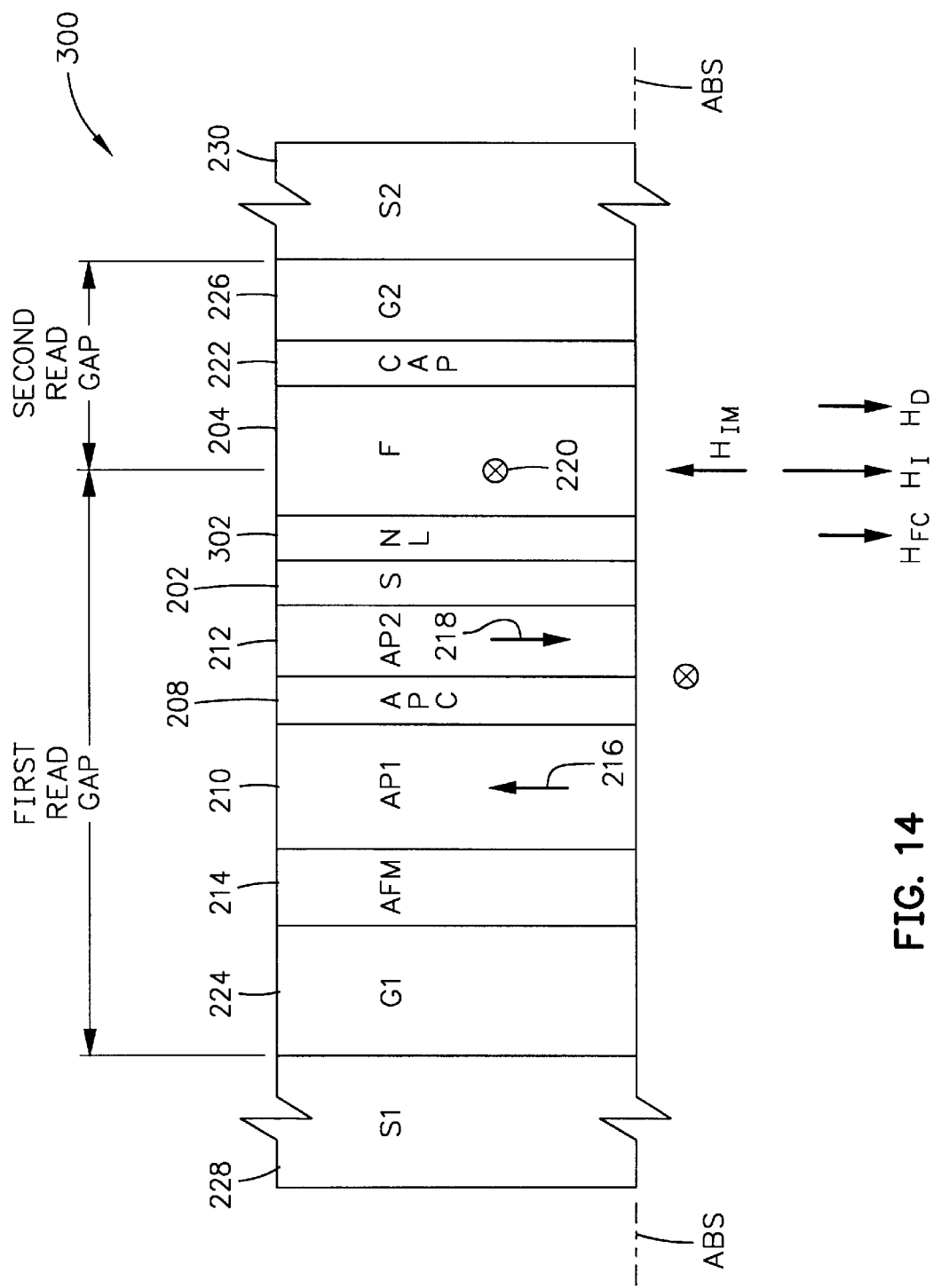
FIG. 14 is a side view of FIG. 12 with the exception that the free layer structure includes a cobalt or cobalt based layer (NL)
Figure 15:
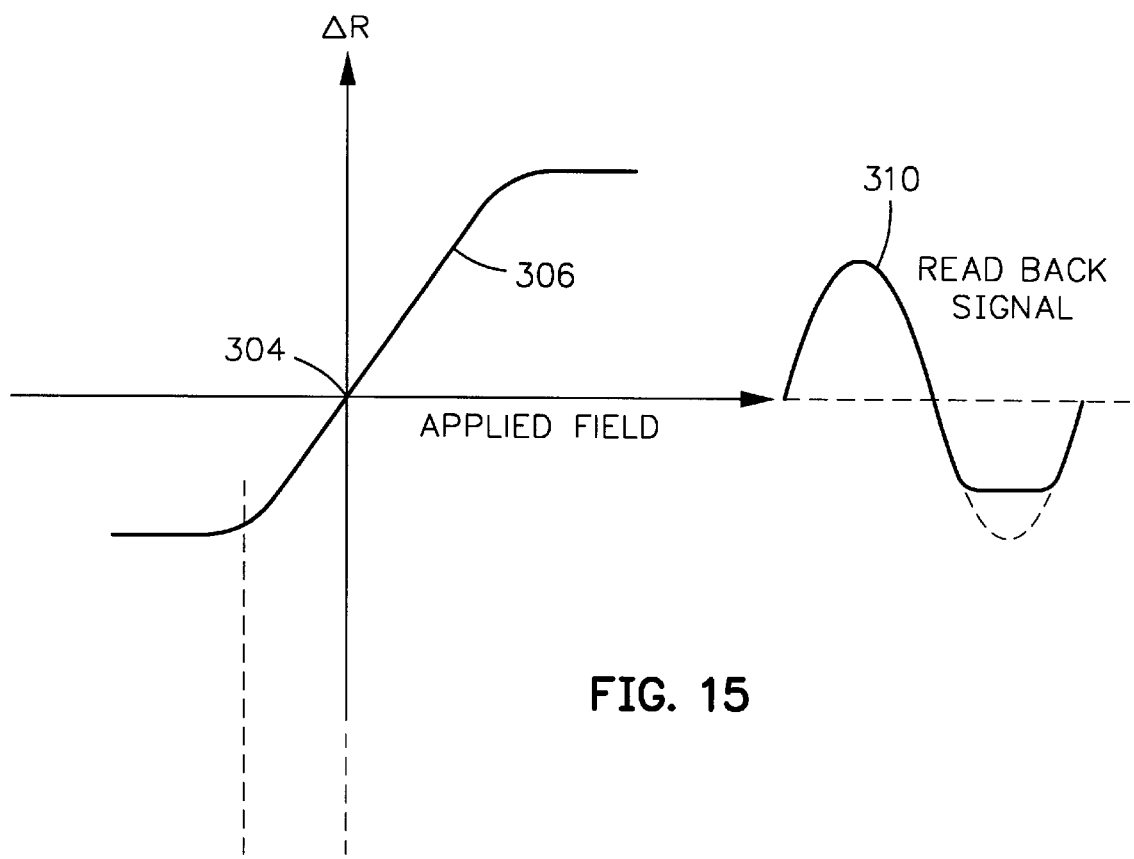
FIG. 15 illustrates an exemplary transfer curve and readback signal for the spin valve sensor shown in FIG. 14.
Figure 16:
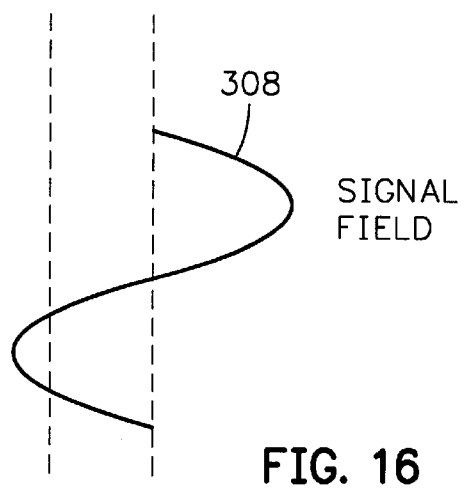
FIG. 16 is an exemplary applied field to the spin valve sensor of FIG. 14.

The spin valve read head 300 shown in FIG. 14 is the same as the spin valve read head shown in FIGS. 12 and 13 except a free layer structure includes the free layer 204 as well as a nanolayer (NL) layer 302. The nanolayer 302 is cobalt or cobalt based and interfaces the spacer layer 202 for increasing the magnetoresistance of the spin valve sensor. Because of the nanolayer 302 the AMR effect $H_{AMR}$, shown in FIG. 13, is essentially nonexistent. This results in only the sense current imaging field $H_{IM}$ opposing the ferromagnetic coupling field $H_{FC}$, the sense current field $H_I$ and the demagnetization field $H_D$. The only way to increase the sense current imaging field $H_{IM}$ without decreasing the linear read density of the read head is to increase the first read gap with a corresponding decrease in the second read gap. This is not a practical option since decreasing the second read gap presents the risk of pinholes in the second gap layer 226 which can cause the leads 142 and 146 in FIG. 11 to short to the second shield layer 154. With the arrangement shown in FIG. 14 the sense current imaging field $H_{IM}$ will not be sufficient to counterbalance the ferromagnetic coupling field $H_{FC}$, the sense current field $H_I$ and the demagnetization field $H_D$. The result is that the ferromagnetic coupling field $H_{FC}$, the sense current field $H_I$ and the demagnetization field $H_D$ overpower the sense current imaging field $H_{IM}$ and cause the magnetic moment 220 of the free layer to become more parallel to the magnetic moment 218 of the second AP pinned layer 212 in a quiescent condition of the sensor. Accordingly, the resistance of the spin valve sensor is less than what it should be in the quiescent condition which means that the magnetic moment 220 is negatively biased which causes positive readback asymmetry. This is illustrated in FIGS. 15 and 16 where the bias point 304 is located below a midpoint of the transfer curve 306 so that when a signal field 308 from a rotating magnetic disk is detected by the read head a readback signal 310 has positive asymmetry with the positive signal being greater than the negative signal. It is this problem that the present invention overcomes.

The Present Invention

Figure 17:
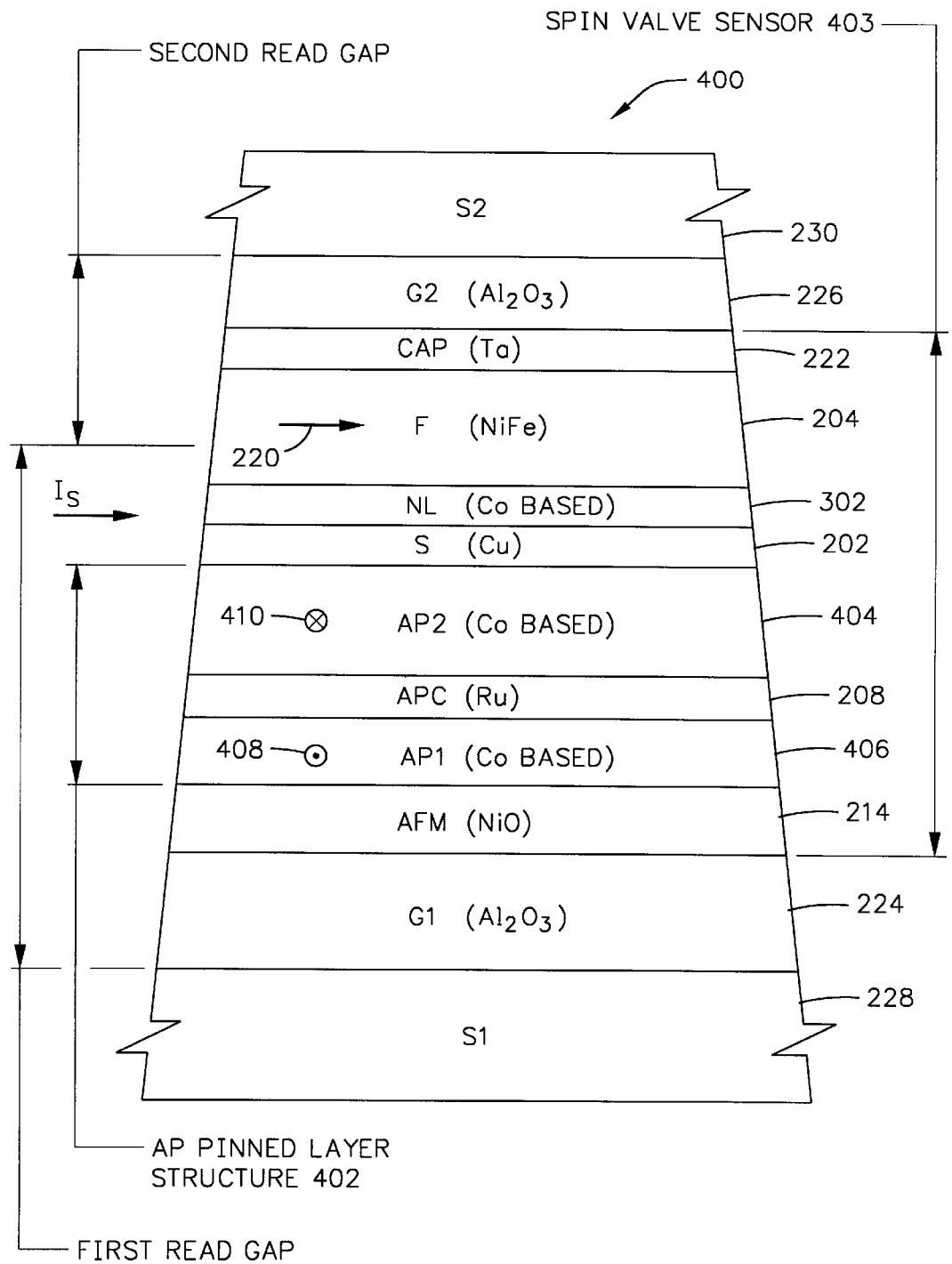
FIG. 17 is the present spin valve sensor wherein the free layer structure includes a cobalt or cobalt based layer.
Figure 18:
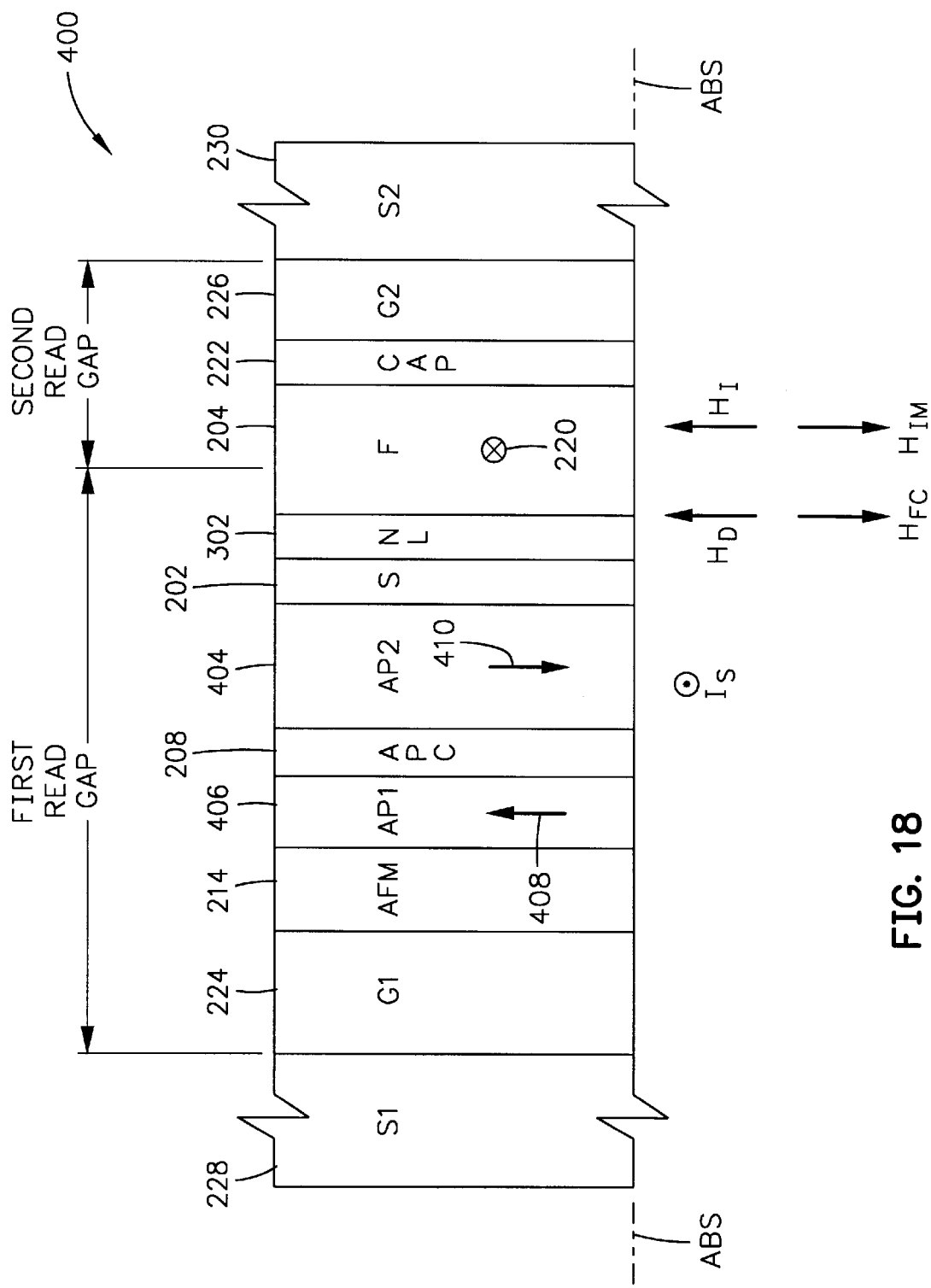
FIG. 18 is a side view of FIG. 17.

The present read head 400 in FIGS. 17 and 18 is the same as the read head 300 shown in FIG. 14 except for an AP pinned layer structure 402 in the spin valve sensor 403. In the AP pinned layer structure 402 the second AP pinned layer 404 is thicker than the first AP pinned layer 406. This permits the net demagnetization field from the AP pinned layer structure 402 to be controlled by the second AP pinned layer 404 instead of the first AP pinned layer 210 shown in FIG. 14. It should be understood that the magnetic spins of the pinning layer 214 in each of the read heads 400 and 300 can be set by a current field which is conducted through the same circuit as the sense current field $I_S$ at a current which is about 10–15 milliamps for a period of about 100 nanoseconds. This causes the temperature of the pinning layer 214 to be raised to a sufficient level that the magnetic spins are free to rotate in the direction of the magnetic moment of the first AP pinned layer 406. The orientation of the magnetic moment 408 of the first AP pinned layer is antiparallel to the magnetic moment 410 of the second AP pinned layer and the magnetic moment 410 is oriented in its direction by a sense current field from the conductive layers 202, 302, 204 and 222. When the reset pulse is terminated the temperature of the pinning layer 214 drops and the magnetic spins are set in place. This type of spin valve sensor is called a resettable type of spin valve sensor.

Figure 19:
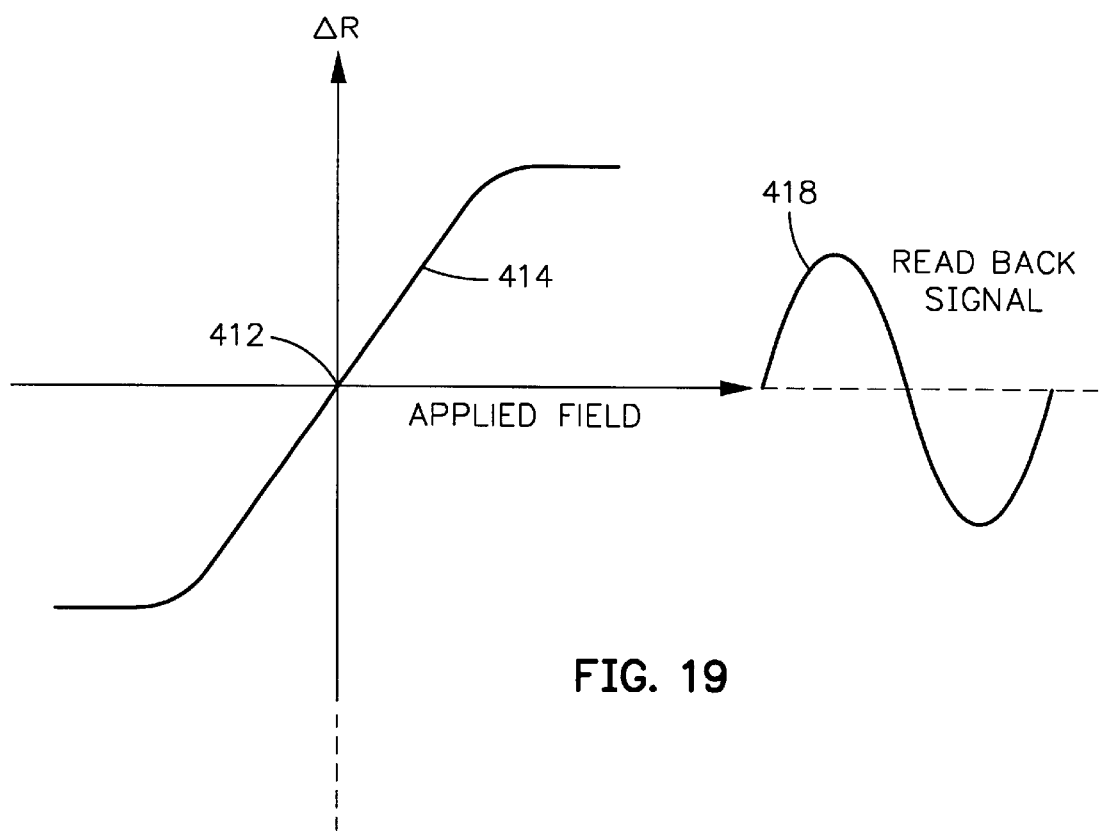
FIG. 19 illustrates a transfer curve and readback signal of the spin valve sensor shown in FIGS. 17 and 18.
Figure 20:
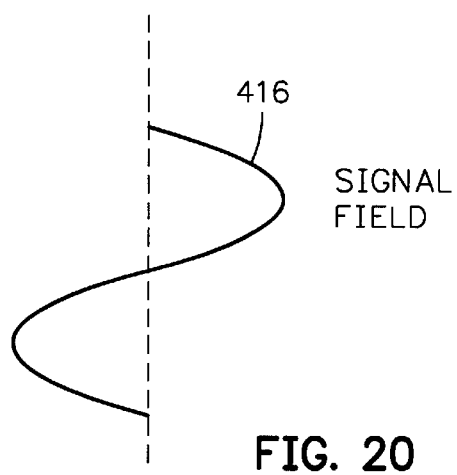
FIG. 20 is an exemplary applied field to the spin valve sensor of FIGS. 17 and 18.

The orientations of the fields acting on the free layer structure of FIG. 17 is shown in FIG. 18. As shown in FIG. 18 the net demagnetization field $H_D$ and the sense current field $H_I$ oppose the ferromagnetic coupling field $H_{FC}$ and the sense current imaging field $H_{IM}$. It is now feasible to properly bias the magnetic moment 220 of the free layer structure which includes the free layer 204 and the nanolayer 302. The proper balancing is shown in FIGS. 19 and 20 wherein the bias point 412 is shown centered on the transfer curve 414 so that when a signal field from a rotating magnetic disk is detected by the spin valve sensor the readback signal 418 is symmetrical.

Figure 21:
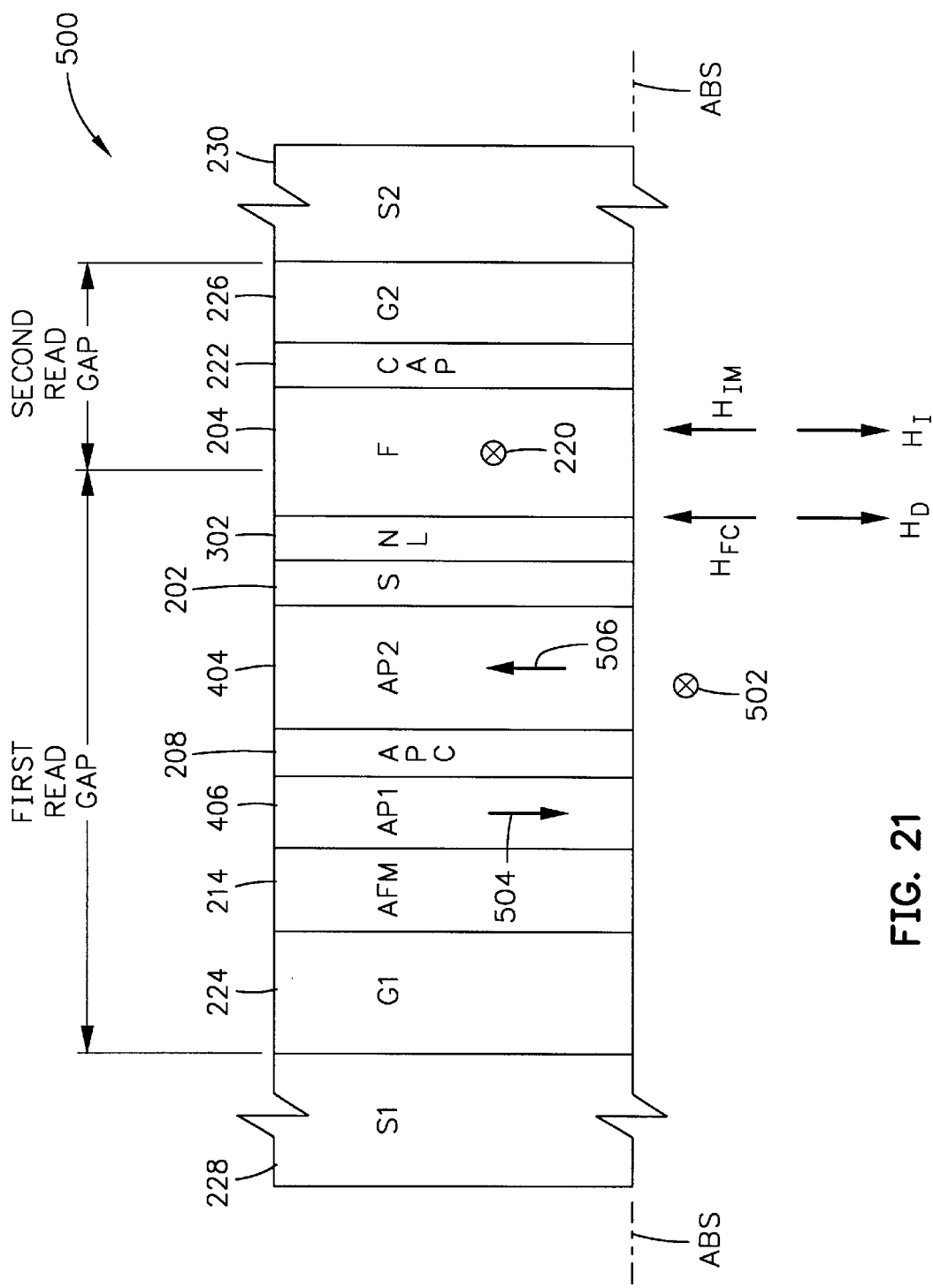
FIG. 21 is the same as FIG. 18 except the sense current $I_S$ has been reversed.

A second embodiment 500 of the present invention is shown in FIG. 21 which is the same as the embodiment 400 shown in FIGS. 17 and 18 except the sense current 502 has been reversed in its direction. In a resettable head this causes the magnetic moments 504 and 506 of the first and second AP pinned layers to be opposite from the magnetic moments 408 and 410 shown in FIG. 18. Further, the sense current imaging field $H_{IM}$ in FIG. 21 is opposite to the sense current field $H_{IM}$ in FIG. 18 and the sense current field $H_I$ is opposite to the sense current field $H_I$ in FIG. 18. With this arrangement the ferromagnetic coupling field $H_{FC}$ and the sense current imaging field $H_{IM}$ oppose the net demagnetization field $H_D$ and the sense current field $H_I$. Again, readback asymmetry is now feasible with the embodiment 500 shown in FIG. 21.

DISCUSSION

It should be understood that the present invention applies to either bottom spin valve sensors as shown in FIGS. 17, 18 and 21 wherein the pinning layer 214 is located closer to the first formed first shield layer 228 than to the second formed second shield layer 230 or to a top spin valve sensor wherein the pinning layer 214 is located closer to the second shield layer than to the first shield layer. In the top spin valve sensor the free layer is constructed before the AP pinned layer structure and the pinning layer is preferably a material other than nickel oxide (NiO) such as iridium manganese (IrMn). In a top antiparallel (AP) spin valve sensor the second AP pinned layer next to the spacer layer would still be thicker than the first AP pinned layer but the second read gap would be larger than the first read gap.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head that has an air bearing surface (ABS) comprising:
   nonmagnetic nonconductive first and second read gap layers;
   a spin valve sensor located between the first and second read gap layers;
   ferromagnetic first and second shield layers;
   the first and second read gap layers being located between the first and second shield layers with the first read gap layer interfacing the first shield layer and the second read gap layer interfacing the second shield layer;
   the spin valve sensor including:
      a free layer structure that has a magnetic moment;
      a ferromagnetic antiparallel (AP) pinned layer structure that has a net magnetic moment;
      a pinning layer exchange coupled to the AP pinned layer structure for pinning the magnetic moment of the AP pinned layer structure;
      a nonmagnetic conductive spacer layer located between the free layer structure and the AP pinned layer structure; and
      the free layer structure including a cobalt (Co) or cobalt based layer that interfaces the spacer layer; the AP pinned layer structure including:
      ferromagnetic first and second antiparallel (AP) pinned layers with the first AP pinned layer interfacing the pinning layer and the second AP pinned layer interfacing the spacer layer;
      an antiparallel (AP) coupling layer located between and interfacing the first and second AP pinned layers; and
      the second AP pinned layer being thicker than the first AP pinned layer;
   a distance from a center of the free layer structure to one of the first and second shield layers being greater than a distance from the center of the free layer structure to the other of the first and second shield layers; and
   sense current source means for conducting a sense current through the sensor parallel to the ABS so that it causes a net sense current field from all conductive layers of the sensor other than the free layer structure and a net image current field from the first and second shield layers to act on the free layer structure so that a net demagnetization field from the AP pinned layer structure and the net sense current field act on the free layer structure in a first direction and are at least partially counterbalanced by a ferromagnetic coupling field by the second AP pinned layer and the net image current field acting on the free layer structure in a second direction which is opposite to said first direction.

2. A magnetic read head as claimed in claim 1 wherein the free layer structure is located between the pinning layer and the second shield layer.

3. A magnetic read head as claimed in claim 2 including:
   the center of the free layer structure being closer to the second shield layer than to the first shield layer; and
   the pinning layer being closer to the first shield layer than to the second shield layer.

4. A magnetic head assembly that has an air bearing surface (ABS) comprising:
   a write head including:
      ferromagnetic first and second pole piece layers that have a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions; and
   a read head including:
      nonmagnetic nonconductive first and second read gap layers;
      a spin valve sensor located between the first and second read gap layers;
      ferromagnetic first and second shield layers; and
      the first and second read gap layers being located between the first and second shield layers with the first read gap layer interfacing the first shield layer and the second read gap layer interfacing the second shield layer; the spin valve sensor including:
         a free layer structure that has a magnetic moment and an easy axis;
         a ferromagnetic antiparallel (AP) pinned layer structure that has a net magnetic moment;
         a pinning layer exchange coupled to the AP pinned layer structure for pinning the magnetic moment of the AP pinned layer structure;
         a nonmagnetic conductive spacer layer located between the free layer structure and the AP pinned layer structure; and
         the free layer structure including a cobalt (Co) or cobalt based layer that interfaces the spacer layer;
   the AP pinned layer structure including:
      ferromagnetic first and second antiparallel (AP) pinned layers with the first AP pinned layer interfacing the pinning layer and the second AP pinned layer interfacing the spacer layer;
      an antiparallel (AP) coupling layer located between and interfacing the first and second AP pinned layers; and
      the second AP pinned layer being thicker than the first AP pinned layer;
   a distance from a center of the free layer structure to one of the first and second shield layers being greater than a distance from the center of the free layer structure to the other of the first and second shield layers; and
   sense current source means for conducting a sense current through the sensor parallel to the ABS so that it causes a net sense current field from all conductive layers of the sensor other than the free layer structure and a net image current field from the first and second shield layers to act on the free layer structure so that a net demagnetization field from the AP pinned layer structure and the net sense current field act on the free layer structure in a first direction and are at least partially counterbalanced by a ferromagnetic coupling field by the second AP pinned layer and the net image current field acting on the free layer structure in a second direction which is opposite to said first direction.

5. A magnetic head assembly as claimed in claim 4 including:
   a nonmagnetic isolation layer located between the second shield layer and the first pole piece layer.

6. A magnetic head assembly as claimed in claim 4 wherein the free layer structure is located between the pinning layer and the first pole piece layer.

7. A magnetic head assembly as claimed in claim 6 including:
the center of the free layer structure being closer to the second shield layer than to the first shield layer; and
the pinning layer being closer to the first shield layer than to the second shield layer.

8. A magnetic disk drive including at least one magnetic head assembly that has an air bearing surface (ABS) and that includes a write head and a read head, the read head including a spin valve sensor, comprising:
the write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
the read head including:
nonmagnetic nonconductive first and second read gap layers;
a spin valve sensor located between the first and second read gap layers;
ferromagnetic first and second shield layers; and
the first and second read gap layers being located between the first and second shield layers with the first read gap layer interfacing the first shield layer and the second read gap layer interfacing the second shield layer;
the spin valve sensor including:
a free layer structure that has a magnetic moment;
a ferromagnetic antiparallel (AP) pinned layer structure that has a net magnetic moment;
a pinning layer exchange coupled to the AP pinned layer structure for pinning the magnetic moment of the AP pinned layer structure;
a nonmagnetic conductive spacer layer located between the free layer structure and the AP pinned layer structure; and
the free layer structure including a cobalt (Co) or cobalt based layer that interfaces the spacer layer; the AP pinned layer structure including:
ferromagnetic first and second antiparallel (AP) pinned layers with the first AP pinned layer interfacing the pinning layer and the second AP pinned layer interfacing the spacer layer;
an antiparallel (AP) coupling layer located between and interfacing the first and second AP pinned layers; and
the second AP pinned layer being thicker than the first AP pinned layer;
a distance from a center of the free layer structure to one of the first and second shield layers being greater than a distance from the center of the free layer structure to the other of the first and second shield layers; and
sense current source means for conducting a sense current through the sensor parallel to the ABS so that it causes a net sense current field from all conductive layers of the sensor other than the free layer structure and a net image current field from the first and second shield layers to act on the free layer structure so that a net demagnetization field from the AP pinned layer structure and the net sense current field act on the free layer structure in a first direction and are at least partially counterbalanced by a ferromagnetic coupling field by the second AP pinned layer and the net image current field acting on the free layer structure in a second direction which is opposite to said first direction;
a housing;
a magnetic disk rotatably supported in the housing;
a support mounted in the housing for supporting the magnetic head assembly with said ABS facing the magnetic disk so that the magnetic head assembly is in a transducing relationship with the magnetic disk;
a spindle motor for rotating the magnetic disk;
an actuator positioning means connected to the support for moving the magnetic head to multiple positions with respect to said magnetic disk; and
a processor connected to the magnetic head assembly, to the spindle motor and to the actuator for exchanging signals with the magnetic head assembly, for controlling movement of the magnetic disk and for controlling the position of the magnetic head assembly.

9. A magnetic disk drive as claimed in claim 8 including:
a nonmagnetic isolation layer located between the second shield layer and the first pole piece layer.

10. A magnetic disk drive as claimed in claim 8 wherein the free layer structure is located between the pinning layer and the first pole piece layer.

11. A magnetic disk drive as claimed in claim 10 including:
the center of the free layer structure being closer to the second shield layer than to the first shield layer; and
the pinning layer being closer to the first shield layer than to the second shield layer.

12. A method of making a magnetic read head, that has an air bearing surface (ABS), comprising the steps of:
forming ferromagnetic first and second shield layers;
forming nonmagnetic nonconductive first and second read gap layers between the first and second shield layers with the first read gap layer interfacing the first shield layer and the second read gap layer interfacing the second shield layer;
forming a spin valve sensor between the first and second read gap layers;
forming the spin valve sensor as follows:
forming a ferromagnetic antiparallel (AP) pinned layer structure that has a magnetic moment;
forming a pinning layer exchange coupled to the AP pinned layer structure for pinning the magnetic moment of the AP pinned layer structure;
forming a ferromagnetic free layer structure that has a magnetic moment;
forming a nonmagnetic conductive spacer layer between the free layer structure and the AP pinned layer structure; and
said forming of the free layer structure further forming a cobalt (Co) or cobalt based layer that interfaces the spacer layer;
the forming of the AP pinned layer structure including:
forming ferromagnetic first and second antiparallel (AP) pinned layers with the first AP pinned layer interfacing the pinning layer and the second AP pinned layer interfacing the spacer layer;
forming an antiparallel (AP) coupling layer between and interfacing the first and second AP pinned layers; and
forming the second AP pinned layer thicker than the first AP pinned layer;

the free layer structure being formed with a center of the free layer structure closer to one of the first and second shield layers than a center of the free layer structure to the other of the first and second shield layers; and forming the sense current source means for conducting a sense current through the sensor parallel to the ABS so that it causes a net sense current field from all conductive layers of the sensor other than the free layer structure and a net image current field from the first and second shield layers to act on the free layer structure so that a net demagnetization field from the AP pinned layer structure and the net sense current field act on the free layer structure in a first direction and are at least partially counterbalanced by a ferromagnetic coupling field by the second AP pinned layer and the net image current field acting on the free layer structure in a second direction which is opposite to said first direction.

13. A method of making a magnetic read head as claimed in claim 12 wherein the free layer structure is formed between the pinning layer and the second shield layer.

14. A method of making a magnetic read head as claimed in claim 13 including:

forming the center of the free layer structure closer to the second shield layer than to the first shield layer; and forming the pinning layer closer to the first shield layer than to the second shield layer.

15. A method of making a magnetic head assembly that has an air bearing surface (ABS) comprising the steps of:

making a write head including the steps of:

forming ferromagnetic first and second pole piece layers in pole tip, yoke and back gap regions wherein the yoke region is located between the pole tip and back gap regions;

forming a nonmagnetic nonconductive write gap layer between the first and second pole piece layers in the pole tip region;

forming an insulation stack with at least one coil layer embedded therein between the first and second pole piece layers in the yoke region; and connecting the first and second pole piece layers at said back gap region; and making a read head including the steps of:

forming a spin valve sensor and first and second nonmagnetic first and second read gap layers with the spin valve sensor located between the first and second read gap layers;

forming ferromagnetic first and second shield layers; and forming the first and second read gap layers between the first and second shield layers;

forming the spin valve sensor as follows:

forming a ferromagnetic antiparallel (AP) pinned layer structure that has a magnetic moment;

forming a pinning layer exchange coupled to the AP pinned layer structure for pinning the magnetic moment of the AP pinned layer structure;

forming a ferromagnetic free layer structure that has a magnetic moment;

forming a nonmagnetic conductive spacer layer between the free layer structure and the AP pinned layer structure; and said forming of the free layer structure further forming a cobalt (Co) or cobalt based layer that interfaces the spacer layer;

the forming of the AP pinned layer structure including:

forming ferromagnetic first and second antiparallel (AP) pinned layers with the first AP pinned layer interfacing the pinning layer and the second AP pinned layer interfacing the spacer layer;

forming an antiparallel (AP) coupling layer between and interfacing the first and second AP pinned layers; and forming the second AP pinned layer thicker than the first AP pinned layer;

the free layer structure being formed with a center of the free layer structure closer to one of the first and second shield layers than a center of the free layer structure to the other of the first and second shield layers; and forming the sense current source means for conducting a sense current through the sensor parallel to the ABS so that it causes a net sense current field from all conductive layers of the sensor other than the free layer structure and a net image current field from the first and second shield layers to act on the free layer structure so that a net demagnetization field from the AP pinned layer structure and the net sense current field act on the free layer structure in a first direction and are at least partially counterbalanced by a ferromagnetic coupling field by the second AP pinned layer and the net image current field acting on the free layer structure in a second direction which is opposite to said first direction.

16. A method of making a magnetic head assembly as claimed in claim 15 including:

forming a nonmagnetic isolation layer between the second shield layer and the first pole piece layer.

17. A method of making a magnetic head assembly as claimed in claim 15 wherein the free layer structure is formed between the pinning layer and the first pole piece layer.

18. A method of making a magnetic head assembly as claimed in claim 17 including:

forming the center of the free layer structure closer to the second shield layer than to the first shield layer; and forming the pinning layer closer to the first shield layer than to the second shield layer.

* * * * *